United States Patent
Alfonso

(10) Patent No.: US 8,488,680 B2
(45) Date of Patent: Jul. 16, 2013

(54) ENCODING AND DECODING METHODS AND APPARATUS, SIGNAL AND COMPUTER PROGRAM PRODUCT THEREFOR

(75) Inventor: Daniele Alfonso, Magenta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1295 days.

(21) Appl. No.: 12/182,954

(22) Filed: Jul. 30, 2008

(65) Prior Publication Data
US 2010/0027678 A1 Feb. 4, 2010

(51) Int. Cl.
H04N 7/12 (2006.01)
H04N 11/02 (2006.01)
H04N 11/04 (2006.01)

(52) U.S. Cl.
USPC .............................. 375/240.21; 375/E7.078

(58) Field of Classification Search
None
See application file for complete search history.

(56) References Cited

U.S. PATENT DOCUMENTS

| | | | |
|---|---|---|---|
| 6,330,370 B2 | 12/2001 | Goyal et al. | |
| 6,345,125 B2 | 2/2002 | Goyal et al. | |
| 6,460,153 B1 | 10/2002 | Chou et al. | |
| 6,625,223 B1 | 9/2003 | Wimmer et al. | |
| 6,665,646 B1 | 12/2003 | John et al. | |
| 6,757,735 B2 | 6/2004 | Apostolopulos et al. | |
| 6,920,177 B2 | 7/2005 | Orchard et al. | |
| 6,920,179 B1 | 7/2005 | Anand et al. | |
| 7,916,789 B2 * | 3/2011 | Kim et al. | 375/240.16 |
| 2004/0066793 A1 * | 4/2004 | Van Der Schaar | 370/437 |
| 2005/0117641 A1 * | 6/2005 | Xu et al. | 375/240.08 |
| 2005/0135477 A1 * | 6/2005 | Zhang et al. | 375/240.08 |
| 2006/0088107 A1 * | 4/2006 | Cancemi et al. | 375/240.27 |
| 2006/0256851 A1 * | 11/2006 | Wang et al. | 375/240.01 |
| 2007/0009039 A1 * | 1/2007 | Ryu | 375/240.16 |
| 2008/0002776 A1 * | 1/2008 | Borer et al. | 375/240.26 |
| 2008/0013620 A1 * | 1/2008 | Hannuksela et al. | 375/240.01 |
| 2008/0043832 A1 * | 2/2008 | Barkley et al. | 375/240 |
| 2008/0232452 A1 * | 9/2008 | Sullivan et al. | 375/232 |
| 2008/0292005 A1 * | 11/2008 | Xu et al. | 375/240.28 |
| 2009/0074070 A1 * | 3/2009 | Yin et al. | 375/240.16 |
| 2009/0238279 A1 * | 9/2009 | Tu et al. | 375/240.16 |

FOREIGN PATENT DOCUMENTS

| | | |
|---|---|---|
| EP | 1 638 337 | 3/2006 |
| WO | 2008/060732 A2 | 5/2008 |

OTHER PUBLICATIONS

Goyal, V. K., "Multiple Description Coding: Compression Meets the Network," IEEE Signal Processing Magazine, pp. 74-93, Sep. 2001.

(Continued)

*Primary Examiner* — Suk Jin Kang
(74) *Attorney, Agent, or Firm* — Seed IP Law Group PLLC

(57) ABSTRACT

A video sequence including images in the form of digital samples is encoded by: subsampling the video sequence to produce: a number N of multiple descriptions of the video sequence, each multiple description including 1/N samples of the video sequence, and a subsampled version of the sequence, the subsampled version having a resolution lower or equal to the resolution of the N multiple descriptions. The N multiple descriptions and the subsampled version are subjected to scalable video coding (SVC) to produce an SVC encoded signal having a base layer and N enhancement layers predicted from said base layer. The subsampled version of the sequence and the N multiple descriptions of the video sequence constitute the base layer and the enhancement layers, respectively, of the SVC encoded signal.

31 Claims, 14 Drawing Sheets

OTHER PUBLICATIONS

Mayer, A. et al., "A Survey of Adaptive Layered Video Multicast using MPEG-2 Streams," 14th IST Mobile and Wireless Communications Summit, Jun. 19, 2005, 5 pages.

Vitali, A. et al., "Video over IP using standard-compatible multiple description coding: an IETF proposal," Journal of Zhejing University Science A 7(5):668-676, 2006.

Folli et al., "Scalable multiple description coding of video sequences," *GTTI*: 1-7, 2008, URL:http://www.gtti.it/GTTI08/files/SessioneScientifica/folli.pdf [retrieved on Sep. 1, 2010].

Richardson, I., "H.264 and MPEG-4 Video Compression—Chapter 5: MPEG-4 Visual", Oct. 17, 2003.

\* cited by examiner

ENCODING AND DECODING METHODS AND APPARATUS, SIGNAL AND COMPUTER PROGRAM PRODUCT THEREFOR

BACKGROUND

1. Technical Field

The present disclosure relates to encoding and decoding techniques.

This disclosure was developed with specific attention paid to its possible use in encoding and/or decoding a video sequence comprised of digital samples.

2. Description of the Related Art

A well established paradigm in encoding a digital video signal is based on the layout illustrated in FIG. 1.

There, an input ("original") video signal Video In is encoded in an encoder to be then transmitted over a channel or stored in a storage medium to be eventually decoded in a decoder and reproduced as a Video Out signal.

FIG. 2 is representative of a Layered Coding (LC) arrangement wherein an original input video signal (Original Video) is additionally subjected to spatial and/or time subsampling in a downsample filter to produce a number N of downsampled video sequences. These downsampled sequences represent multiple descriptions (MD) of the original video signal. These multiple descriptions are then encoded in a bitstream including a plurality of layers each containing one of the representations of the original signal. The various layers are ordered and encoded in such a way that the layers 0 to i−1 are used as a prediction for encoding the i-th layer.

Specifically, FIG. 2 emphasizes how in the encoding process the original video signal and the downsampled version thereof may be subjected to two parallel encoding processes one of which is hierarchically dependent on the other e.g. via inter-layer prediction. The block diagram of FIG. 2 is exemplary of a "higher" representation being encoded having reference to the "lower" representation. Consequently, the two signals are encoded via two encoders that are similar to each other, and additionally, encoding the "dependent" representation may re-use certain encoding elements from the "independent" representation.

The two encoder blocks of FIG. 2 plus the inter-layer prediction block and the MUX element may in fact be the building blocks of a single "layered" encoder.

FIG. 2 refers to two representations, but a hierarchy including a generic number of representations may be considered, where the lower hierarchical level (level n=0) designated the "base" layer (BL) and each upper layer (level n>0) represents an "enhancement" layer (EL) with respect to the preceding layers in the hierarchy from which it depends.

During the decoding process, the i-th layer of the bitstream can be decoded starting from the results of decoding the previous layers. Increasing the number of layers in the bitstream increases the fidelity in reproducing the original signal form the signals being decoded.

Scalable Video Coding (SVC) as provided by the ITU-T/MPEG standards (ITU-T Rec. H.264/ISO 14496-10 AVC, Annex G "Scalable Video Coding") is exemplary of layered coding which extends the H.264/AVC standards by means of a layered encoding process which enables spatial, time and quality scaling of the decoded signal.

FIG. 3 herein is representative of a SVC processing layout including one base layer and two enhancement layers. Each layer includes a temporal decomposition step followed by motion/texture coding and entropy coding. The original video sequence is fed directly to the input of the Enhancement Layer 2 and via cascaded 2D decimation operations to the Enhancement Layer 1 and the Base Layer. The output of the various layers (Base Layer, Enhancement Layers 1 and 2) are multiplexed to generate the output SVC encoded bitstream.

In another encoding/decoding paradigm, known as Multiple Description Coding (MDC) as schematically represented in FIG. 4, the original video signal representing the input of the encoding process is subsampled in a multiple description (MD) filter to produce N different multiple descriptions. Each of these descriptions is then independently encoded in an encoder. The encoded descriptions are multiplexed to generate a bitstream to be transmitted and/or stored.

In the decoding process, the fidelity of the signal decoded (i.e. reproduced) to the original signal increases with an increasing number of descriptions that are received and decoded. The block diagram of FIG. 4 represents MDC encoding to descriptions MD1 and MD2.

Advantages of layered coding (LC) over multiple description coding (MDC) are:
 a greater efficiency in signal compression; and
 a higher flexibility in adapting the decoded signal (scalability).

Advantages of MDC over LC are:
 a higher "robustness" with respect to errors, in case of transmission over a noisy channel; and
 a higher transmission efficiency in case of peer-to-peer (P2P) applications.

The article by A. Vitali et al. "Video Over IP Using Standard-Compatible Multiple Description Coding: an EPF Proposal"—Proceedings of the 2006 Packet Video Workshop, Hangzhou, China, provides a detailed review of LC and MDC.

Internet Protocol TeleVision (IPTV) is a digital TV service provided using the IP protocol over a wideband network infrastructure such as the Internet.

IPTV is becoming one of the most significant applications within the framework of digital video technology. Projects aiming at producing IPTV set-top boxes for receiving High Definition TV (HDTV) over IP and using the 802.11n standard are currently in progress.

FIG. 5 is a schematic representation of an exemplary IPTV scenario including one or more video servers distributing their programs to final users (home users) via hubs receiving the programs from one or more head end hubs.

A feature of IPTV is the Video On Demand (VOD) capability, which permits any user in the system to access at any time a given TV content. At a given time instant, each user may notionally access a different content, whereby conventional point-to-point multicast transmission of encoded contents (left-hand side of FIG. 6) would require a very large bandwidth. For that reason, IPTV may resort to peer-to-peer (P2P) transmission protocols (right hand side of FIG. 6) in order to permit users to exchange their contents thus relieving the provider from the task of individually sending a given content to each and every user that has requested it.

Recent research in the area of P2P protocols demonstrates that MDC encoding can greatly improve efficiency of such a distribution system for multimedia contents. By resorting to MDC, users may exchange different alternative representations of the original system, thus increasing the efficiency of connections between peers within the P2P network. The various representations received may be eventually re-composed to reconstruct the original signal with an increasing quality as a function of the number of the descriptions that are received.

FIG. 7 herein schematically shows how a "fast" peer (i.e. a peer having a bandwidth available which is larger than the bandwidth available to other peers) may connect to various "slow" peers to unload therefrom alternative multiple descriptions which are then re-composed. Specifically, FIG. 7 refers to a sequence of five images (P0, . . . , P4), which is de-composed in four different descriptions (D0, . . . , D3) each of which is represented with a different degree of shading.

Another useful feature for IPTV is adaptability of the content to the terminal, so that the digital video signal received can be effectively reproduced on different types of terminals adapted to be connected to an IPTV system, such as High Definition TV (HDTV) receivers, conventional Standard Definition TV (SDTV) receivers, PC desktops, PC laptops, PDAs, smart phones, IPods, and so on.

FIG. 8 herein is representative of the scalability concept based on which an original video sequence may be converted into an encoded bitstream which is "scalable", i.e. may be reproduced after possible scaling in terms of "spatial" scalability (that is with images reproduced on a wider or smaller scale in terms of size/number of pixels reproduced), "quality" scalability (important with a change of resolution) and/or "temporal" scalability (e.g. as "slow" video).

BRIEF SUMMARY

One embodiment provides a flexible arrangement wherein e.g. the decoded signal may be scaled as a function of the capabilities of the receiving terminals as regards spatial resolution of the display unit, the frame rate, the video quality and the computation resources.

One embodiment provides an arrangement which combines the advantages of LC and MDC, especially as regards compatibility with the SVC standard.

One embodiment is a method having the features set forth in the claims that follow. This disclosure also relates to corresponding encoding/decoding apparatus as well as to a corresponding signal. The disclosure also relates to a corresponding computer program product, loadable in the memory of at least one computer and including software code portions for performing the steps of the method of this disclosure when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure as provided herein.

An embodiment of this disclosure is a method which combines the LC encoding paradigm with the MDC paradigm by using the SVC Video Encoding Standard (ITU-T/MPEG SVC).

An embodiment of the arrangement described herein makes it possible to combine the advantages of LC and MDC within a framework compatible with SVC, by giving raise to improved encoding efficiency with respect to the prior art.

In an embodiment of the arrangement described herein, flexibility is provided by compliance with the SVC standard by using an LC encoding paradigm such that the bitstream including the various representations of the original video signal can be scaled by simply discarding those packets which correspond to those layers that are not necessary, whereby the resulting bitstream can be decoded by using a representation of the original video signal in the format held to be the most suitable for the intended use.

An embodiment of the arrangement described herein makes it possible to provide a P2P network (for which MDC encoding is advantageous) and a set-top box adapted for serving different terminals (for which the scalability as offered by the SVC standard is advantageous.

BRIEF DESCRIPTION OF THE SEVERAL VIEWS OF THE DRAWINGS

Embodiments will now be described, by way of example only, with reference to the enclosed representations, wherein.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
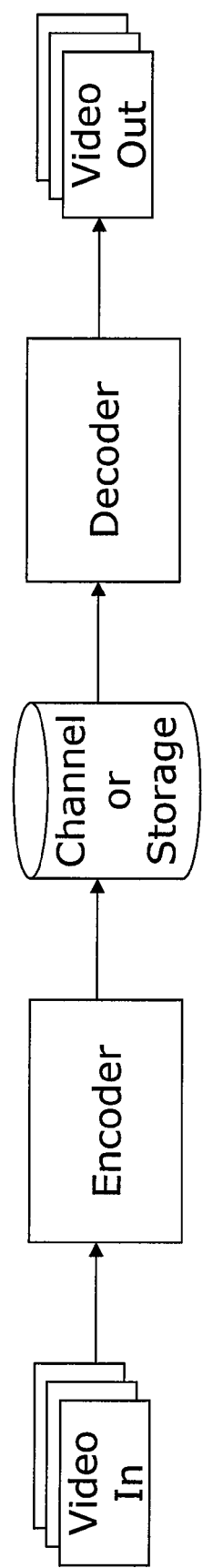
FIGS. 1 to 8 have already been discussed in the foregoing.
Figure 2:
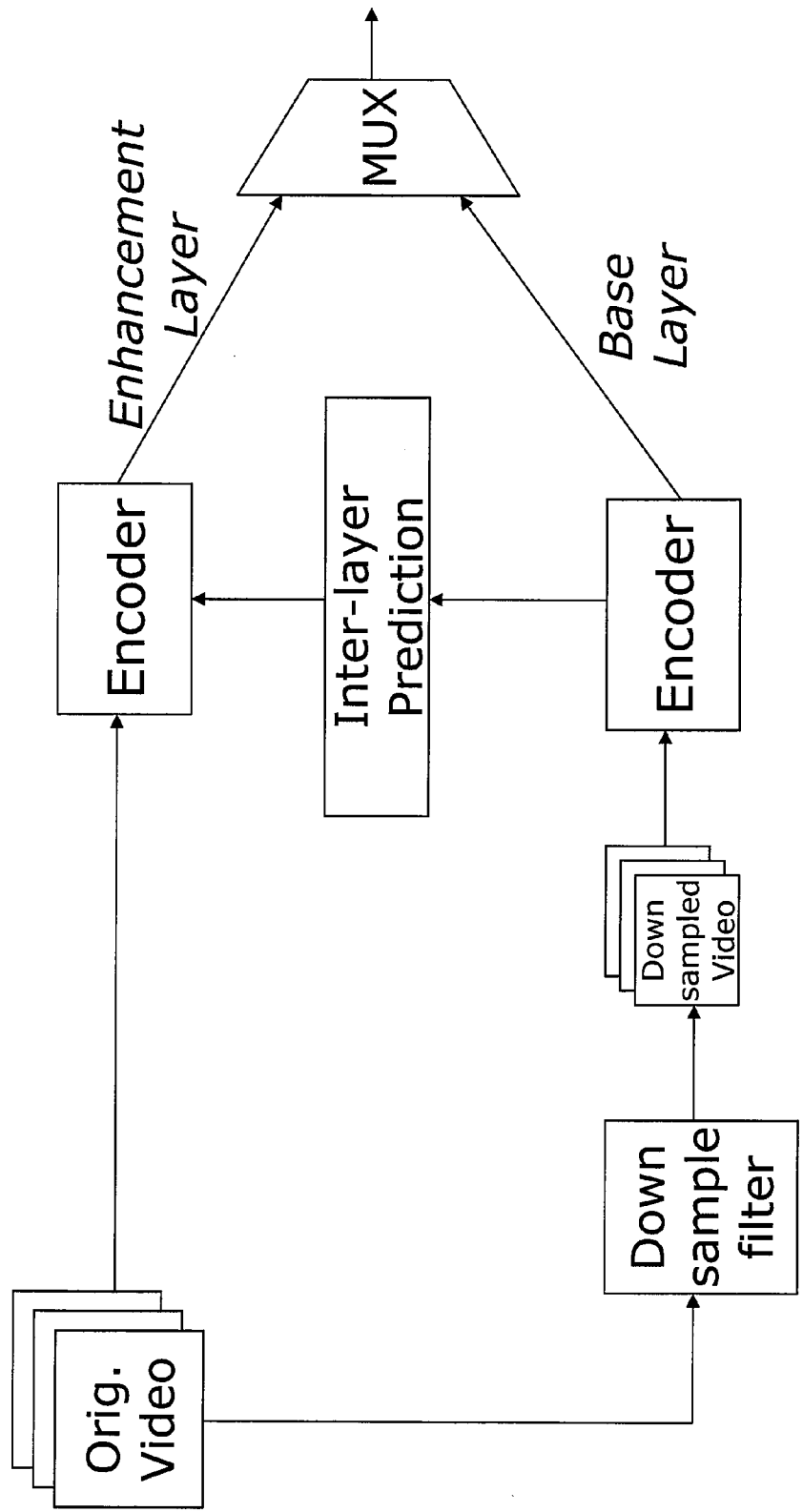
Figure 3:
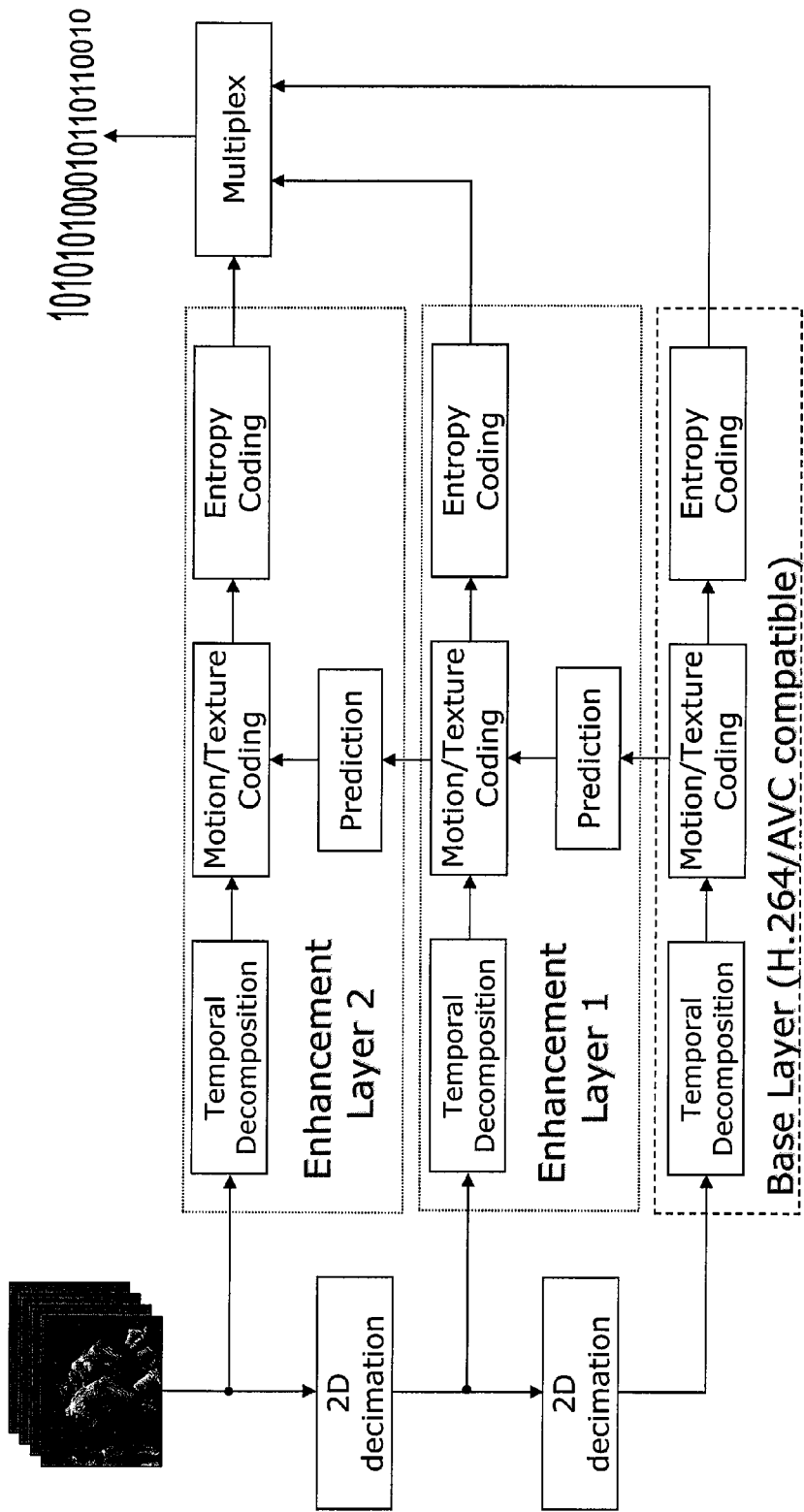
Figure 4:
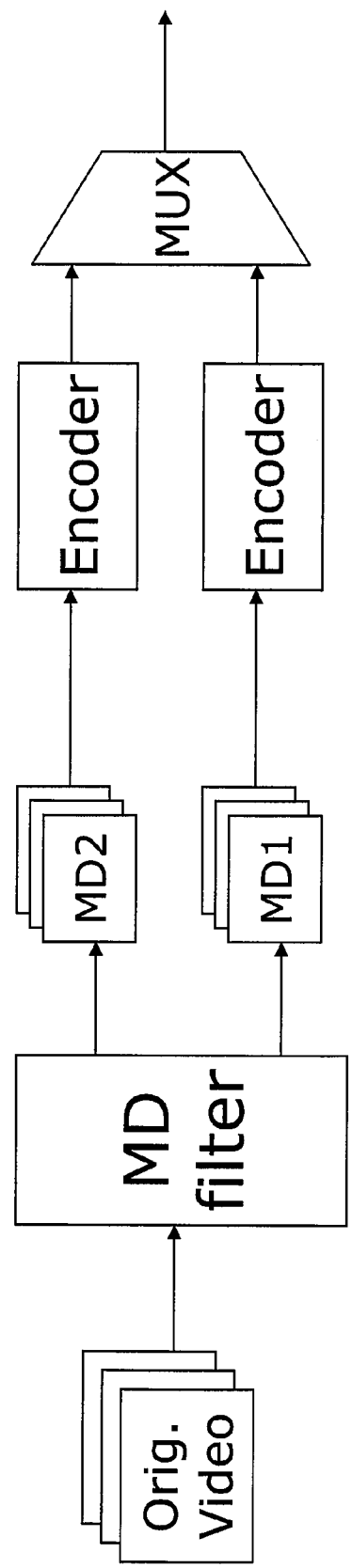
Figure 5:
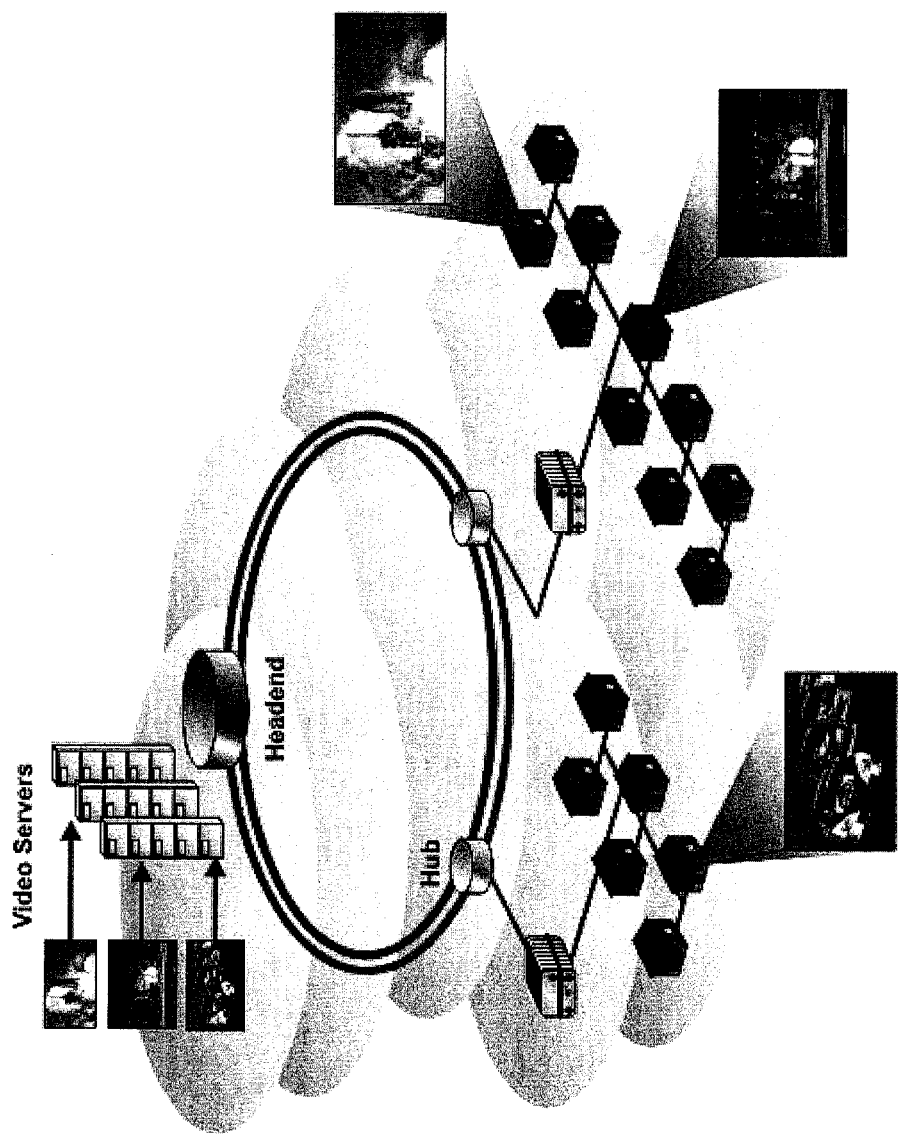
Figure 6:
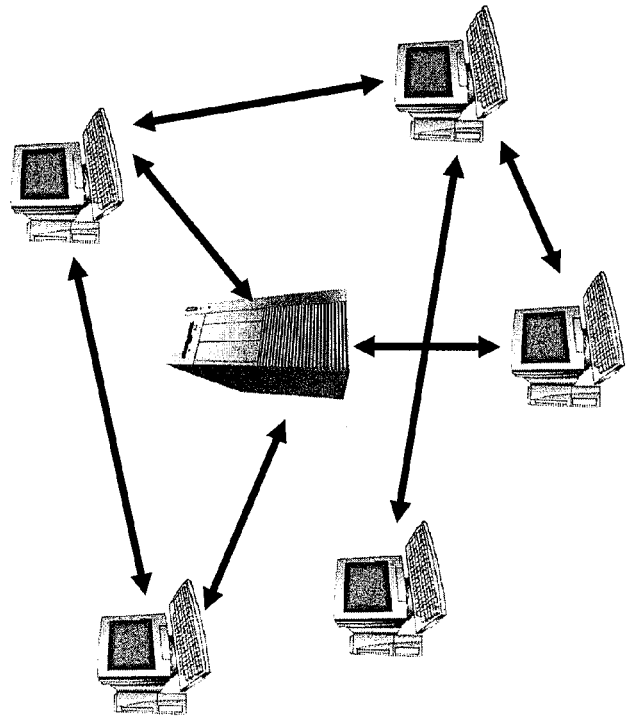
Figure 6:
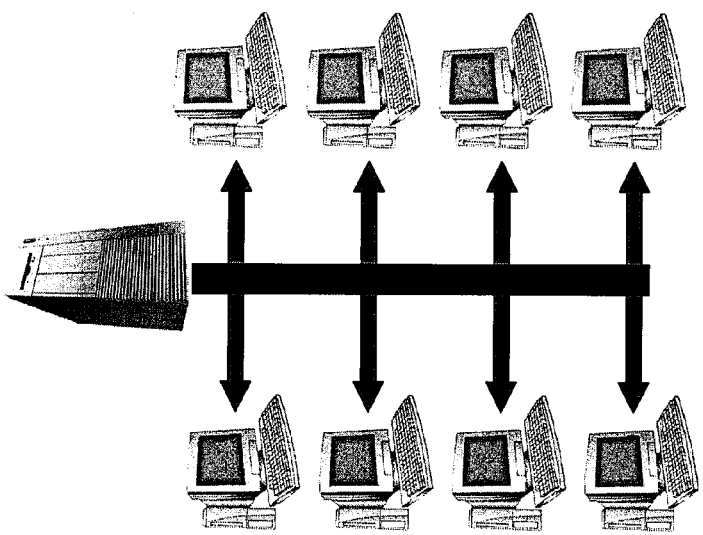
Figure 7:
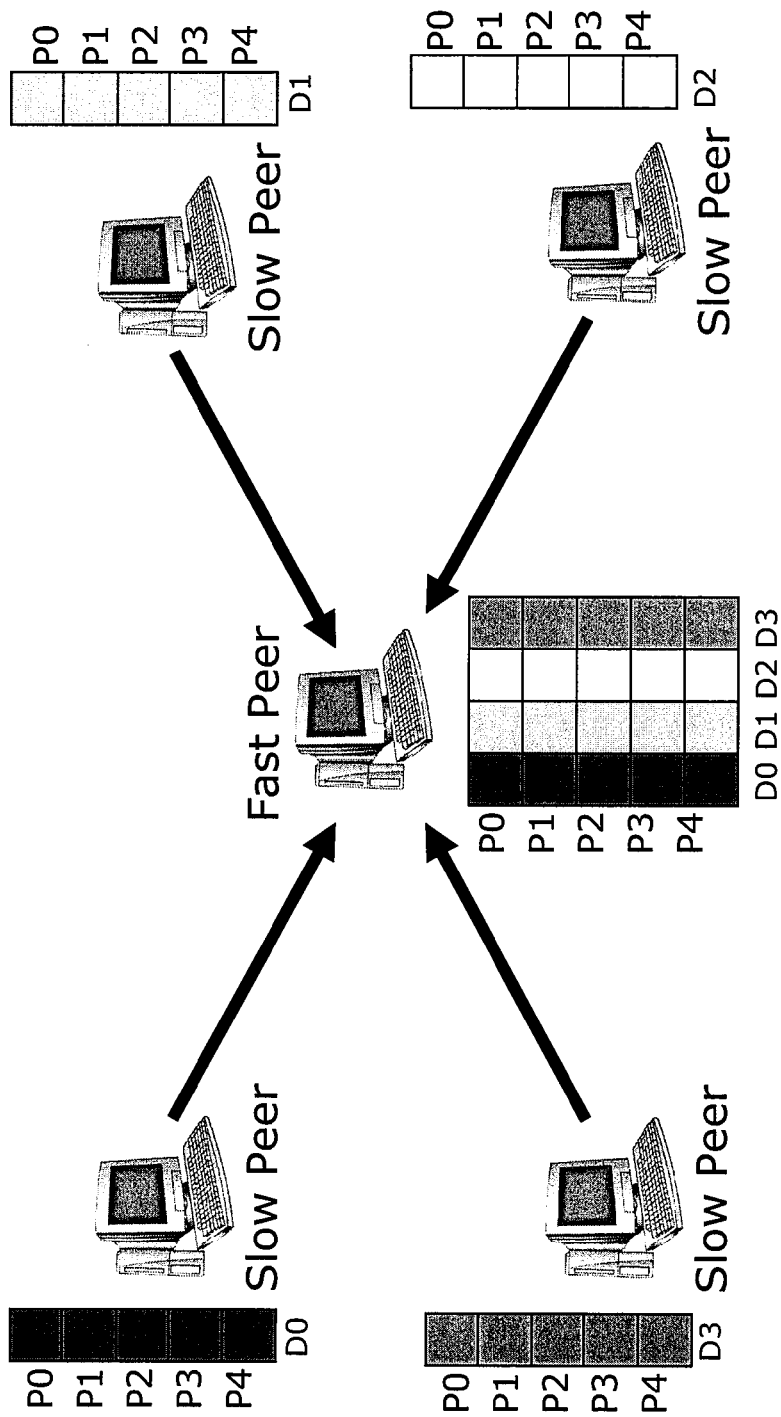
Figure 8:
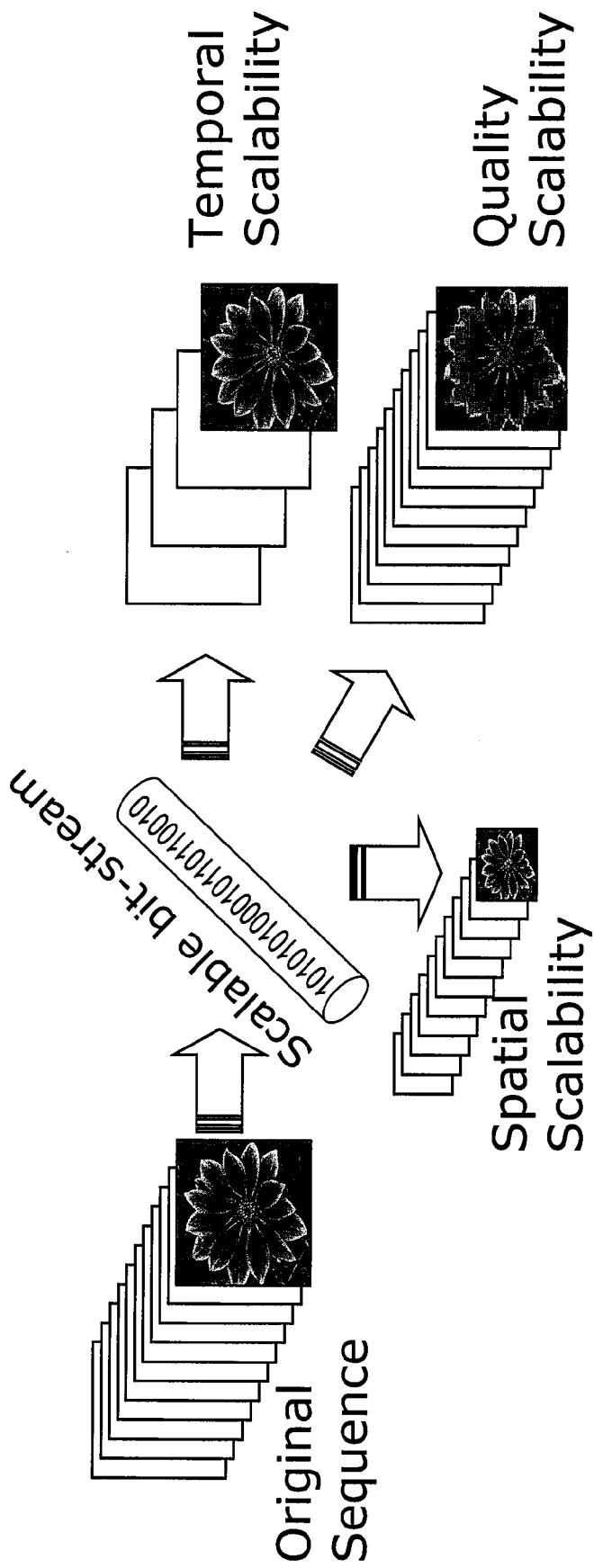
Figure 9:
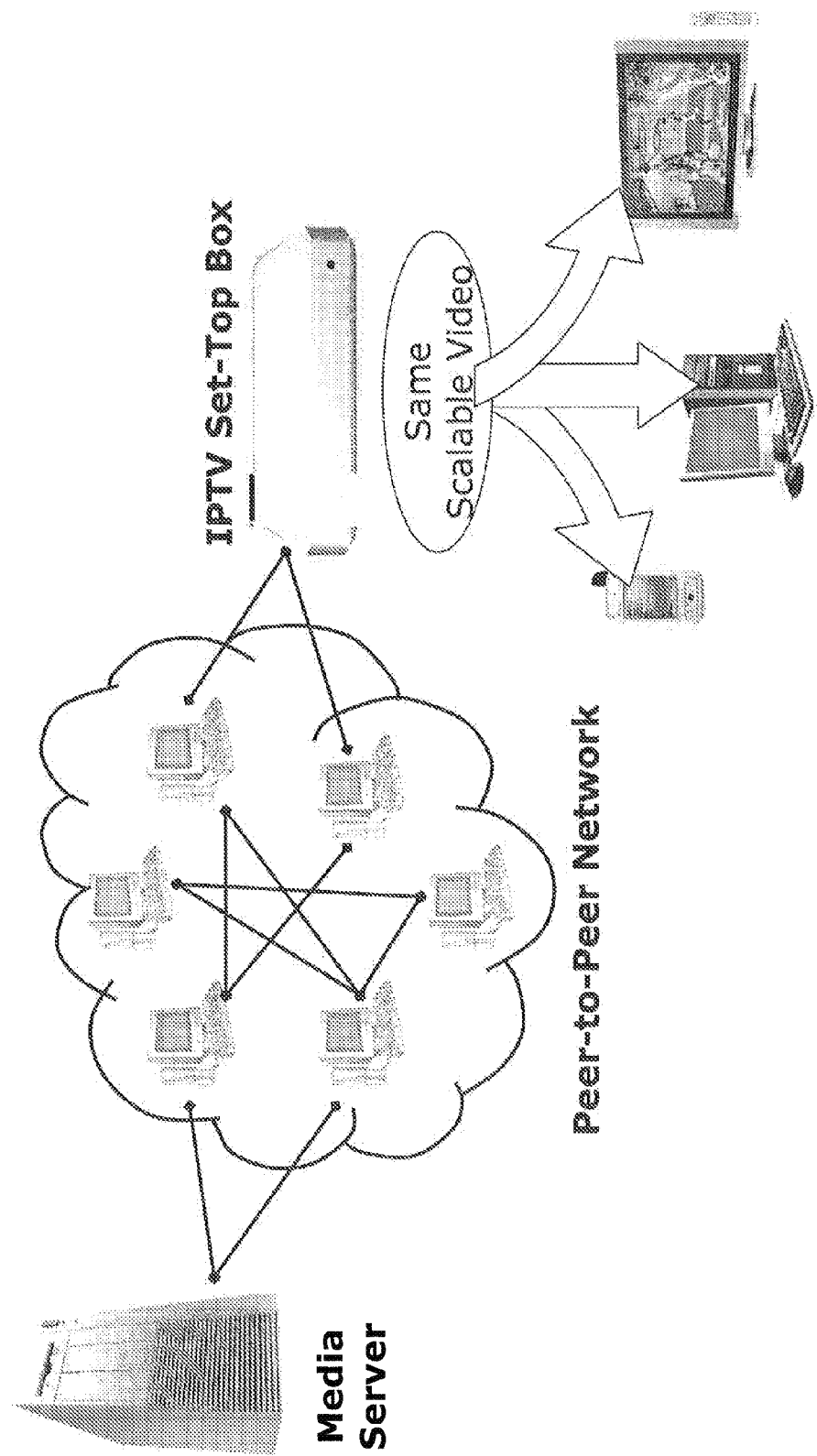
FIG. 9 is a general layout of a possible embodiment of an IPTV system where contents (video images) from a media server are distributed over a peer-to-peer network.

FIG. 9 is a general layout of a possible embodiment of an IPTV system where contents (video images) from a media server are distributed over a peer-to-peer network including terminals which may be of different types, in terms of e.g., spatial resolution of the display unit, frame rate, quality and computational resources.

Figure 10:
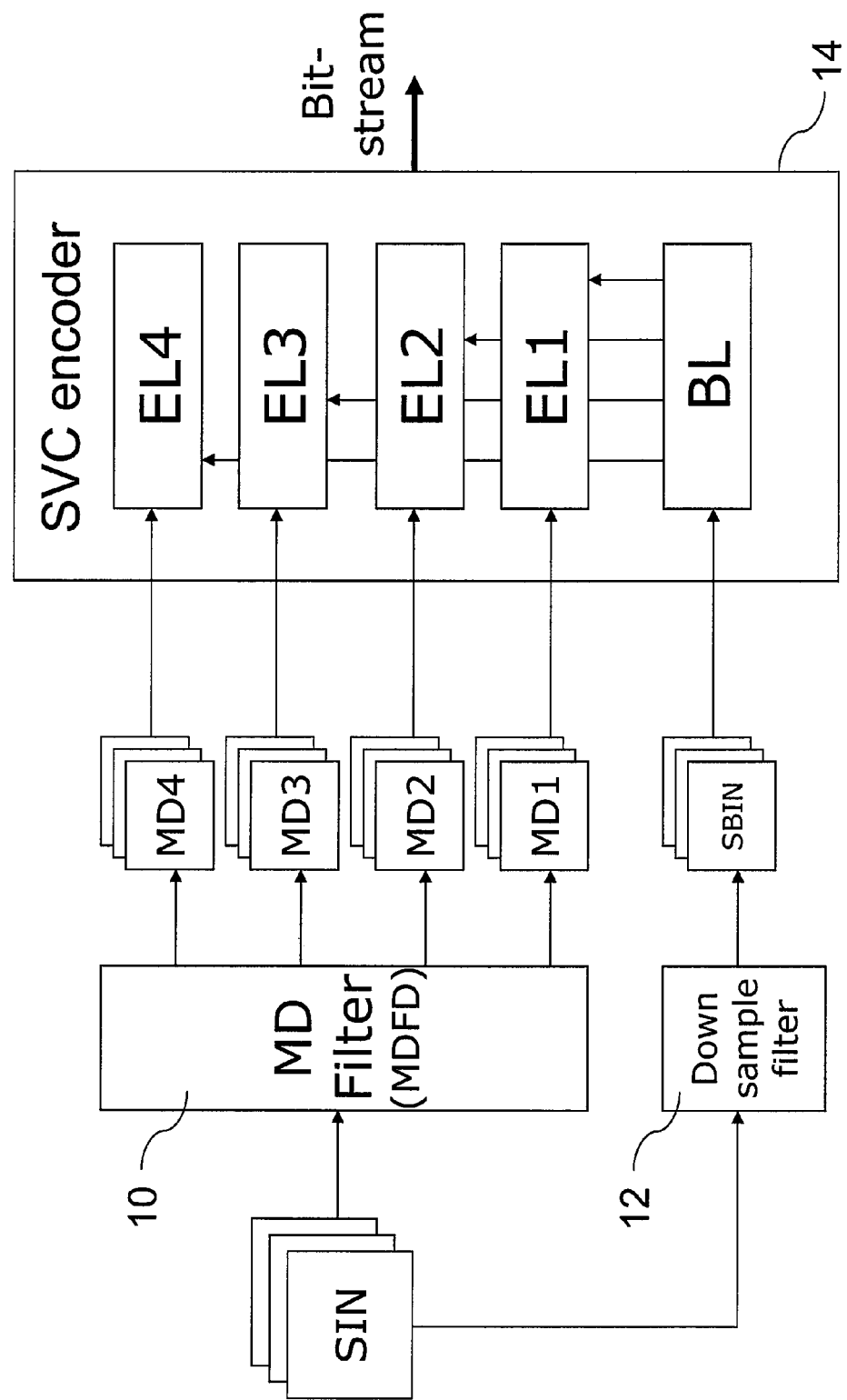
FIG. 10 is a block diagram representative of an embodiment of an encoding method as described herein.

FIG. 10 is a block diagram representative of an exemplary encoding process wherein an input video sequence SIN is sent to a spatial and/or time downsampling filter (MDFD) 10 to produce a number N of multiple description (MD1, MD2, . . . , MDN) of the input signal. In the exemplary embodiment illustrated N=4.

The input signal SIN is also spatially subsampled in a downsample filter (DS) 12 to produce a downsampled version SBIN of the input signal SIN having a spatial and temporal resolution which is lower or equal to the resolution of the N multiple descriptions MD1, MD2, . . . , MDN.

Subsequently, the various downsampled video signals thus generated are encoded in an encoder 14 complying with the SVC (scalable video coding) standard to generate an encoded output bitstream.

In an embodiment, the encoder 14 provides encoding as follows.

The downsampled signal SBIN from the downsample filter 12 is encoded as the base layer BL of the SVC bitstream resulting from encoding in the encoder 14.

The multiple descriptions MD1, ..., MDN are encoded as enhancement layers (ELs) of the of the SVC bitstream. Each enhancement layer EL1, EL2, ..., ELN (in the exemplary embodiment illustrated N=4) can be of the spatial or CGS (Course Grain Scalability) type.

Each enhancement layer EL1, EL2, EL3, EL4 is spatially predicted by the base layer. The inter-layer prediction mechanism of SVC leads to each enhancement layer being encoded efficiently.

Consequently, the encoding arrangement exemplified in FIG. 10 is more efficient than any method where multiple descriptions are encoded as completely distinct bitstreams. Additionally, the bitstream output from the encoder 14 is scalable, in that the base layer BL may be decoded independently of the enhancement layers. These in turn are encoded independently of each other, according to the MDC paradigm.

If compared to conventional single description encoding, MDC encoding introduces a redundancy in the data. In the embodiment illustrated in FIG. 10, the redundancy associated with multiple descriptions is "moved" to the base layer BL of the SVC encoding scheme, with the additional advantage of making this totally compatible with the H.264/AVC standard. Thus, the embodiment illustrated in FIG. 10 turns into an advantage what could be regarded as a disadvantage inherent in multiple description coding.

The encoding arrangement as exemplified in FIG. 10 exhibits a number of advantages:

scalability, related to the use of the SVC standard;

robustness to errors and/or the higher efficiency in the case of P2P transmission for the enhancement layers, which is related to the use of the MDC paradigm;

higher encoding efficiency with respect to a conventional MDC encoding, which is a further advantage deriving from combining MD and SVC;

compliance with the SVC standard; specifically the arrangement as exemplified herein does not require any additional encoding/decoding capability with respect to video encoding/decoding capability as provided by IPU/MPEG video standards, while also ensuring full compatibility with SVC specifications.

Tests performed by the Applicant indicate that the rate-distortion efficiency of the arrangement exemplified herein compares well with the efficiency of a conventional MD encoding arrangement for various test sequences. For instance, comparisons with MD arrangements including four multiple descriptions independently encoded according to the H.264/AVC standard indicate that substantially the same quality in terms of PSNR ratio of the same level can be ensured while obtaining, in the case of the arrangement exemplified herein, a much higher encoding efficiency (for instance in excess of 25% in the case of the "Crew" test sequence).

Figure 11:
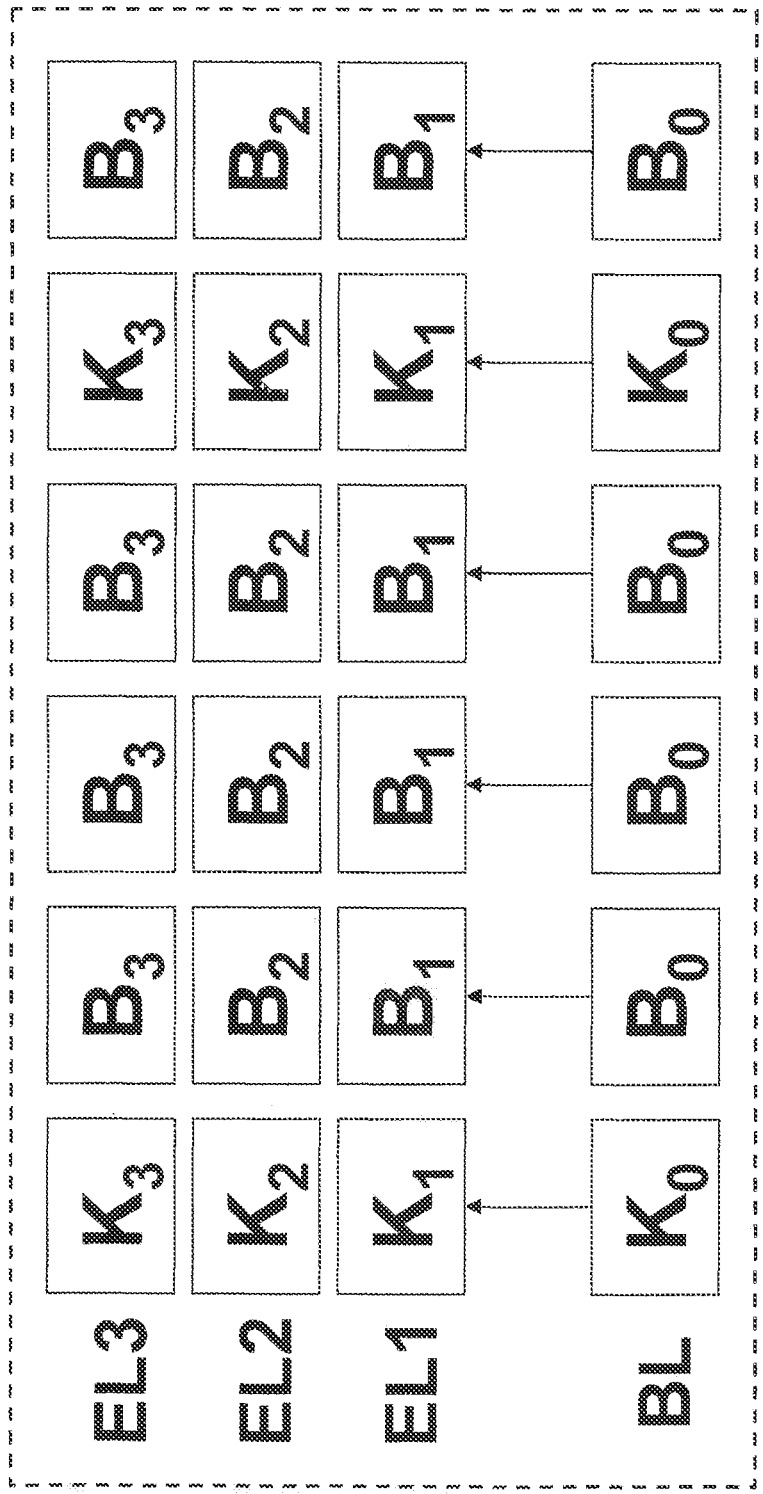
FIG. 11 is representative of a bitstream structure as derivable by using the arrangement of FIG. 10.

FIG. 11 is representative of an exemplary layout of the SVC bitstream encoded by resorting to the arrangement of FIG. 11.

In each layer (BL=Base Layer; EL1, EL2, EL3=Enhancement Layers) each image is subdivided in slices, each of which includes a sequence of macro blocks belonging to that image. Each slice is encoded within a packet, designated NALU (Network Abstraction Layer Unit), and the data contained in the packets of the base layer are used to decode data included in the packets of the enhancement layers.

The packets are designated with K and B suffixes to denote the time prediction structure used by the SVC encoding process. There, K denotes a key picture (of the I or P type), while B denotes images encoded as hierarchical B-pictures. The representation of FIG. 11 refers to an exemplary case where each image is constituted by a single slice, but in fact each image may be comprised of plural slices.

Figure 12:
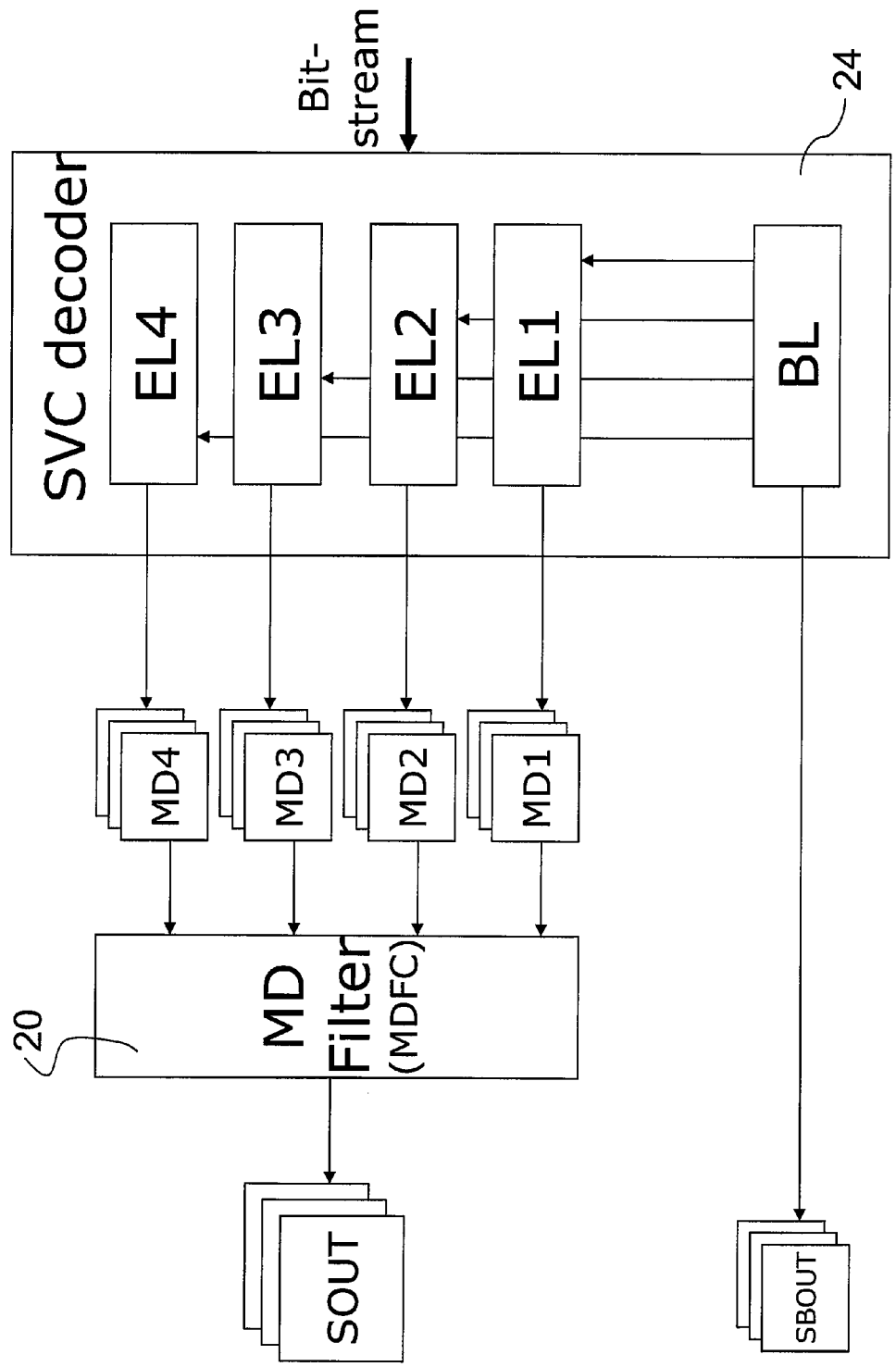
FIG. 12 is a block diagram representative of an embodiment of the coding method as described herein.

The block diagram of FIG. 12 is exemplary of a decoder adapted to decode a bitstream (input, right hand side of FIG. 12) encoded according to the principles exemplified in the foregoing.

The bitstream to be decoded is first fed to an otherwise conventional SVC decoder 24, to extract (in a manner known per se) the base layer BL and the various enhancement layers EL1, EL2, EL3.

The enhancement layers are fed to an MD filter 20 which plays the role of a multiple description filter-composer (MDFC) with the purpose of performing spatial and/or time filtering of the multiple descriptions by applying in an inverse manner the de-composition filter (Multiple Description Filter-Decomposer or MDFD) 10 which generated the multiple descriptions for the encoder 14 of FIG. 10. The decoded signal comprised in the output of the decoder may be reconstructed with the original spatial and time resolution of the input signal.

In an exemplary embodiment, the encoder 10 of FIG. 10 is an encoder according to the SVC standard (ITU-T Rec.H 264/ISO 14498-10 AVC, annex G "Scalable Video Coding").

Those of skill in the art will appreciate that arrangement described herein is in no way linked to any specific approach adopted for generating the multiple descriptions MD1, MD2, ..., MDN. Any conventional method adapted to generate such multiple description can be used within the framework of the instant disclosure.

In an embodiment, two multiple descriptions are generated by spatially subsampling the input sequence by using—for each image and each row of pixels—the even pixels for description MD1 while the odd pixels are used for description MD2. In that way, two descriptions MD1, MD2 are obtained each having a spatial resolution which is one half the spatial resolution of the original sequence.

The approach described in the foregoing may be extended to the columns of each image to derive for descriptions MD1, ..., MD4, each having a resolution which is ¼ (one fourth) the resolution of the original sequence. Stated otherwise, each image in the input video sequence SIN is sub divided in sub-blocks including 2×2 pixels and each pixel is used to compose a different description.

From the mathematical viewpoint, a generic pixel (x, y) of each image t in each description MDi (i=1 ..., 4) generated from the input video signal SIN has the following value:

$$MD1(x,y,t)=SIN(2x,2y,t)$$

$$MD2(x,y,t)=SIN(2x+1,2y,t)$$

$$MD3(x,y,t)=SIN(2x,2y+1,t)$$

$$MD4(x,y,t)=SIN(2x+1,2y+1,t)$$

where x=1, ..., W(SIN)/2, y=1, ..., H(SIN)/2

Figure 13:
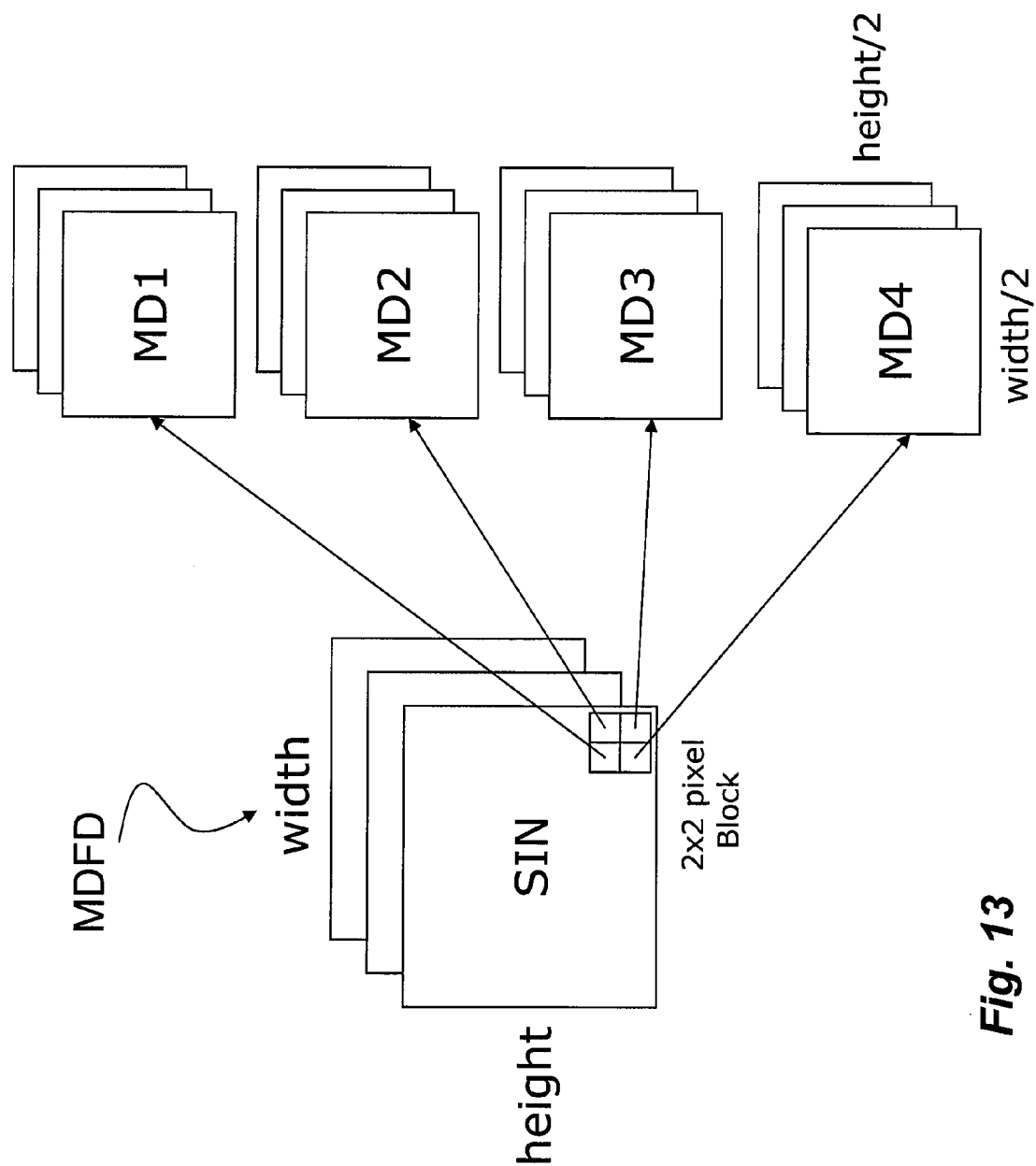
FIG. 13 is a block diagram representative of an embodiment of the arrangement described herein.

The block diagram of FIG. 13 is exemplary of such an approach adopted in a MDFD to generate four multiple descriptions MD1, MD2, MD3, MD4 each having a resolution which is one fourth the resolution of the original sequence SIN.

In an embodiment, an input sequence can be subdivided into two multiple descriptions each having a time resolution half the time resolution of the input sequence by simply using the even images for the first description and the odd images for the second description.

Figure 14:
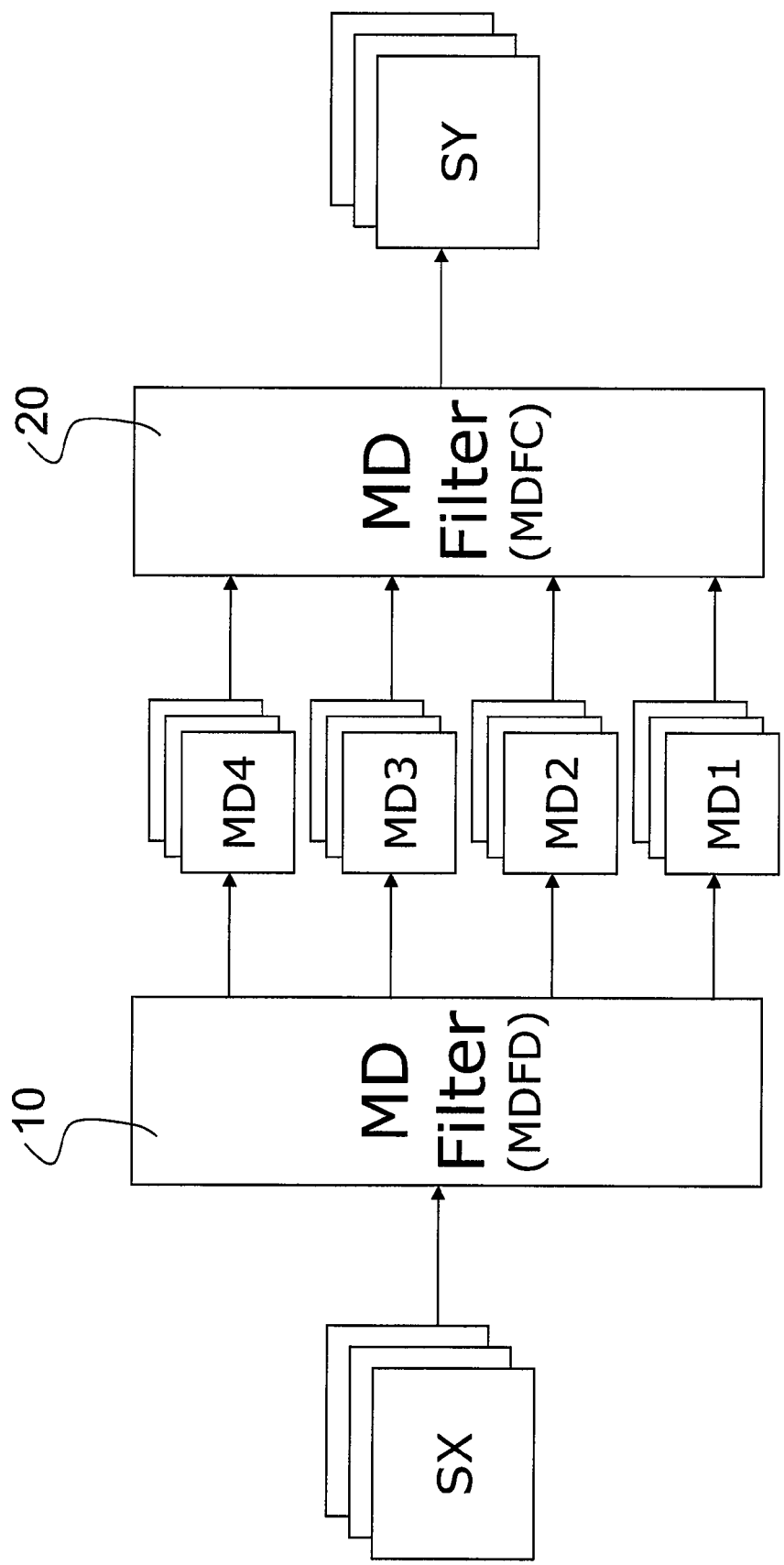
FIG. 14 is a block diagram representative of certain features of the arrangement described herein.

The block diagram of FIG. 14 is illustrative of the complementary roles played by MDFD and MDFC filters 10 and 20 as illustrated in FIGS. 10 and 12 in an embodiment compliant with the SVC standard, wherein the encoder and the decoder are conformant with the same profile and layer according to the specifications for the SVC standard.

By assuming that the input SX to the encoder (i.e. the MDFD filter 10) of FIG. 10 is a digital video sequence SIN having the following parameters:

$W(SIN)$=width of the images (measured in pixels), $H(SIN)$=height of the images (again measured in pixels), $F(SIN)$ frame-rate, namely number of images per second, then any spatially and/or time down sampling operation of the sequence SIN will give rise to a second sequence (SBIN) with homologous parameters W, H, and F such that:

$W(SB) \leq W(SIN)$ $H(SB) \leq H(SIN)$ $F(SB) \leq F(SIN)$ where SIN and SB denote the original input sequence and the downsampled sequence, respectively.

The MDFD filter 10 when receiving the input sequence SIN, generates therefrom N multiple descriptions MD1, ..., MDN each of which meets the following requirements:

$W(SB) \leq W(MDi) \leq W(SIN)$ $H(SB) \leq H(MDi) \leq H(SIN)$ $F(SB) \leq F(MDi) \leq F(SIN)$, where SIN and SB again denote the original input sequence and sub sampled sequence, respectively, while MDi denotes the i-th of the N multiple descriptions generated by the filter 10.

When coupled as represented in FIG. 14, the MDFD and MDFC filters 10 and 20 are in a condition to reproduce an output sequence which is notionally identical to the input sequence. That is, by referring to FIG. 14 if PSNR (SX, SY)=∞, or—equivalently—MSE (SX, SY)=0.

The input sequence SBIN sent to the SVC encoder and encoded as the base layer of the scalable bitstream, or the header of each NALU packet used for encoding the SIDN sequence may include the following syntax elements:

dependency_id=0 quality_id=0 layer_base_flag=1.

In an embodiment, the multiple descriptions (MDi) i=1, ..., N are sent to the SVC encoder and encoded as enhancement layers (ELi) of the spatial type, or the header of each NALU packet used for encoding the i-th multiple description may contain the following syntax elements:

dependency_id=$i$ quality_id=0 layer_base_flag=0.

In an embodiment, the slices in each ELi exploit an inter-layer prediction from the base layer, while the header in each NALU of the enhancement layers Eli include the syntax element:

base_id=0.

In an embodiment, the SVC decoder decodes the base layer BL by producing a video signal designated SOUT and further decodes all the enhancement layers Eli, each containing one of the multiple descriptions MDi the original sequence. These multiple descriptions MDi are then composed by the MDFC filter in such a way to provide a representation SOUT of the input sequence SIN.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
encoding a video sequence including images in the form of digital samples, the encoding including:
producing, by spatially subsampling said video sequence using a multiple-description filter decomposer, a number N of different multiple descriptions of said video sequence, each multiple description including 1/N samples of said video sequence, and
producing, by spatially subsampling, an additional sub-sampled version of said video sequence, said sub-sampled version having a resolution lower or equal to the resolution of said N multiple descriptions, and
producing a scalable video coding (SVC) encoded signal having a base layer and N enhancement layers predicted from said base layer by subjecting said N multiple descriptions and said subsampled version to scalable video coding (SVC), wherein SVC-encoded versions of said subsampled version of said video sequence and said N multiple descriptions of said video sequence constitute the base layer and the enhancement layers, respectively, of the said SVC encoded signal, and said enhancement layers are encoded independent of each other.

2. The method of claim 1, wherein said subsampling said video sequence includes taking alternate pixels in the images of said video sequence for different ones of said multiples descriptions.

3. The method of claim 2, wherein said subsampling said video sequence includes taking alternate pixels in the rows of the images of said video sequence for different ones of said multiple descriptions.

4. The method of claim 2, wherein said subsampling said video sequence includes taking alternate pixels in the columns of the images of said video sequence for different ones of said multiple descriptions.

5. The method of claim 1, wherein said subsampling said video sequence includes time subsampling said video sequence.

6. The method of claim 1, wherein said N multiple descriptions are encoded as spatial type enhancement layers of said SVC encoded signal.

7. The method of claim 1, wherein said N multiple descriptions are encoded as Course Grain Scalability type enhancement layers of said SVC encoded signal.

8. The method of claim 1 wherein each said enhancement layer is spatially predictable from said base layer.

9. The method of claim 1, including subdividing images in said layers in slices, each slice including a sequence of macro blocks belonging to a respective one of the images in said layers.

10. The method of claim 1, including subdividing the images in said layers in slices, wherein each slice is encoded within at least one packet.

11. The method of claim 1, including encoding the images in said layers in packets wherein said packets are designated with distinct suffixes to denote a time prediction structure used by said SVC encoding.

12. The method of claim 11, wherein said packets are designated with suffixes denoting key pictures and hierarchical B-pictures.

13. The method of claim 1 wherein producing said additional subsampled version comprises employing a downsample filter.

14. The method of claim 1, wherein said number N of multiple descriptions is selected equal to four.

15. A non-transitory computer-readable medium storing contents that cause a computing device to perform a method comprising:
   encoding a video sequence including images in the form of digital samples, the encoding including:
      producing, by spatially subsampling said video sequence using a multiple-description filter decomposer, a number N of different multiple descriptions of said video sequence, each multiple description including 1/N samples of said video sequence;
      producing, by spatially subsampling said video sequence, an additional subsampled version of said video sequence, said subsampled version having a resolution lower or equal to the resolution of said N multiple descriptions; and
      producing a scalable video coding (SVC) encoded signal having a base layer and N enhancement layers predicted from said base layer by subjecting said N multiple descriptions and said subsampled version to scalable video coding (SVC), wherein SVC-encoded versions of said subsampled version of said video sequence and said N multiple descriptions of said video sequence constitute the base layer and the enhancement layers, respectively, of the said SVC encoded signal, and each of the enhancement layers are independently encoded.

16. The non-transitory computer-readable medium of claim 15, wherein said N multiple descriptions are encoded as spatial type enhancement layers of said SVC encoded signal.

17. The non-transitory computer-readable medium of claim 15, wherein said producing the additional subsampled version comprises using a downsample filter.

18. An encoder for encoding a video sequence including images in the form of digital samples, the encoder comprising:
   a multiple description filter-decomposer (MDFD) structured to produce a number N of different multiple descriptions of said video sequence, each multiple description including 1/N samples of said video sequence;
   a downsample filter structured to produce an additional subsampled version of said video sequence, said subsampled version having a resolution lower or equal to the resolution of said N multiple descriptions; and
   a scalable video coding (SVC) encoder structured to receive said multiple descriptions and said subsampled version to produce therefrom an SVC encoded signal having a base layer and N enhancement layers predicted from said base layer, wherein SVC-encoded versions of said subsampled version of said video sequence and said N multiple descriptions of said video sequence constitute the base layer and the enhancement layers, respectively, of the said SVC encoded signal, and each of the enhancement layers is encoded independent of the other enhancement layers.

19. The encoder of claim 18 wherein said SVC encoder is structured to encode said N multiple descriptions as spatial type enhancement layers of said SVC encoded signal.

20. The encoder of claim 18 wherein said SVC encoder is structured to encode said N multiple descriptions as Course Grain Scalability type enhancement layers of said SVC encoded signal.

21. The encoder of claim 18 wherein each of said enhancement layers is spatially predictable from said base layer.

22. A method, comprising:
   decoding a scalable video coding (SVC) encoded signal conveying a video sequence including images in the form of digital samples, the decoding including:
      extracting from said SVC encoded signal a base layer and a number N of enhancement layers predicted from said base layer, wherein said enhancement layers have been encoded independent of each other and are based on a number N of different multiple descriptions generated using a multiple-description filter decomposer;
      obtaining from the base layer a subsampled version of said sequence;
      obtaining from said enhancement layers a number N of different multiple descriptions of said video sequence by spatially predicting each enhancement layer from the base layer, each multiple description including 1/N samples of said video sequence, and said base layer including a spatially subsampled version of said video sequence having a resolution lower or equal to the resolution of said N multiple descriptions; and
      spatially re-constructing said video sequence from at least part of said multiple descriptions and said subsampled version of said video sequence.

23. The method of claim 22, wherein said N enhancement layers are spatial type enhancement layers of said SVC encoded signal.

24. The method of claim 22, wherein said N enhancement layers are CGS type enhancement layers of said SVC encoded signal.

25. The method of claim 22, including spatially predicting each said enhancement layers from said base layer.

26. A non-transitory computer-readable medium storing contents that cause a computing device to perform a method comprising:

decoding a scalable video coding (SVC) encoded signal conveying a video sequence including images in the form of digital samples, the decoding including:
- extracting from said SVC encoded signal a base layer and a number N of enhancement layers predicted from said base layer, wherein said enhancement layers have been encoded independent of each other and are based on a number N of different multiple descriptions generated using a multiple-description filter decomposer;
- obtaining from the base layer a subsampled version of the video sequence;
- obtaining from said enhancement layers a number N of different multiple descriptions of said video sequence, each multiple description including 1/N samples of said video sequence, and said base layer including a spatially subsampled version of said video sequence having a resolution lower or equal to the resolution of said N multiple descriptions; and
- spatially re-constructing said video sequence from at least part of said multiple descriptions and said subsampled version of said video sequence.

27. The non-transitory computer-readable medium of claim 26, wherein said N enhancement layers are spatial type enhancement layers of said SVC encoded signal.

28. The non-transitory computer-readable medium of claim 26, wherein said N enhancement layers are CGS type enhancement layers of said SVC encoded signal.

29. The non-transitory computer-readable medium of claim 26, including spatially predicting each said enhancement layers from said base layer.

30. A decoder for decoding a scalable video coding (SVC) encoded signal conveying a video sequence including images in the form of digital samples, the decoder comprising:
- an SVC decoder structured to decode said SVC encoded signal and extract therefrom a base layer and a number N of enhancement layers predicted from said base layer, wherein said enhancement layers have been independently encoded and are based on a number N of different multiple descriptions generated using a multiple-description filter decomposer; and
- a multiple description filter-composer (MDFC) structured to obtain from said enhancement layers a number N of different multiple descriptions of said video sequence, each said multiple description including 1/N samples of said video sequence, wherein said video sequence is reconstructable from at least part of said multiple descriptions and a subsampled version of said video sequence obtained from said base layer wherein said subsampled version has a resolution lower or equal to the resolution of said N multiple descriptions.

31. The decoder of claim 30 wherein said SVC decoder is configured to spatially predict each said enhancement layer from said base layer.

* * * * *